Figure 1:
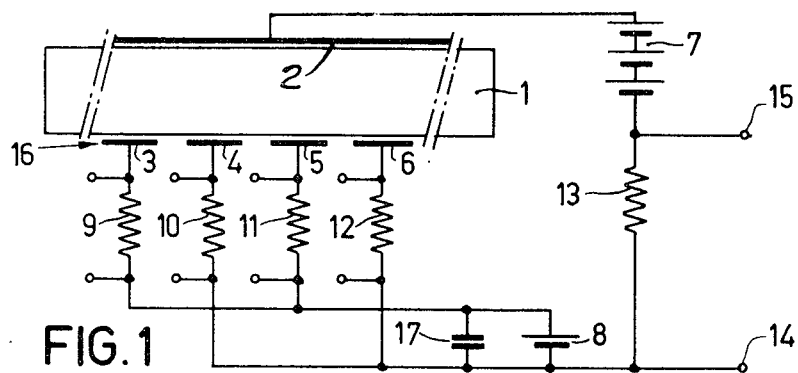

United States Patent

[11] 3,624,399

| | | |
|---|---|---|
| [72] | Inventors | Jacob Anne Den Boer;<br>Johan Hendrik Dieperink; Karel Mulder,<br>all of Amsterdam, Netherlands |
| [21] | Appl. No. | 768,034 |
| [22] | Filed | Oct. 16, 1968 |
| [45] | Patented | Nov. 30, 1971 |
| [73] | Assignee | U. S. Philips Corporation<br>New York, N.Y. |
| [32] | Priority | Oct. 25, 1967 |
| [33] | | Netherlands |
| [31] | | 6714455 |

[54] SEMICONDUCTOR DEVICE FOR DETECTING RADIATION
8 Claims, 2 Drawing Figs.

[52] U.S. Cl. .................................................... 250/83.3, 250/83, 317/235
[51] Int. Cl. ..................................................... G01t 1/24
[50] Field of Search .......................................... 250/83, 83.3; 317/235 (27), 235 (31)

[56] References Cited
UNITED STATES PATENTS

| | | | |
|---|---|---|---|
| 2,985,805 | 5/1961 | Nelson .......................... | 317/235 (27) |
| 3,102,959 | 9/1963 | Diemer.......................... | 250/83.3 |
| 3,229,104 | 1/1966 | Rutz.............................. | 317/235 (27) |

OTHER REFERENCES
IEEE Transactors on Nuclear Science; June, 1966, pp. 208-213. 250/83.3

Primary Examiner—James W. Lawrence
Assistant Examiner—Morton J. Frome
Attorney—Frank R. Trifari ABSTRACT: A radiation detector is described comprising a semiconductor disc having crossed strip electrodes on opposite sides with the output taken from the strips of one of the electrodes. To reduce crosstalk, a small voltage is applied between the strips in addition to the usual back-biasing voltage across the electrodes.

PATENTED NOV 30 1971 3,624,399

INVENTOR.
JACOB A. DEN BOER
JOHAN H. DIEPERINK
KAREL MULDER
BY

Frank R. Trifari
AGENT

SEMICONDUCTOR DEVICE FOR DETECTING RADIATION

The invention relates to a semiconductor device for detecting radiation, which device comprises a semiconductor monocrystalline slice the two large oppositely located surfaces of which are provided with electrodes, at least one of the electrodes constituting a rectifying junction with the slice and a polarization voltage being applied between the electrodes, said junction being polarized in the reverse direction, and the other electrode constituting a conductive junction with the slice, at least one electrode being subdivided into a number of parallel electrode strips separated from each other. Such a subdivision of at least one of the electrodes is used for determining the place on which the radiation is incident. See, for instance, copending application, Ser. No. 619,465, filed Feb. 28, 1967, and *IEEE Transactions on Nuclear Science*, June, 1966, pp. 208–213.

Such detectors enable measurements of varying natures of corpuscular and of electromagnetic radiation. For example, besides the place of the incident radiation, the intensity and/or angular distribution of the radiation can be measured, but also, for example, the energy or the mass of the particles of the radiation to be detected.

It is known that in such devices, electric crosstalk may occur between the electrode strips, that is to say that in addition to the desired signal on an electrode strip smaller stray signals are observed on other electrode strips. It has been found that the value of the stray signals also depends upon the thickness of the semiconductor slice of the detector and that particularly in detectors having a thin semiconductor slice, for example, (dE/dx)-detectors, a very large crosstalk is observed. The dependence on the thickness of the slice is the result of capacitive coupling between the two electrodes located on oppositely located sides of the slice.

In order to eliminate the electric crosstalk through said capacitive coupling it has already been proposed to derive, instead of the potential of one electrode strip, the potential difference between two electrode strips as the information-containing signal from the detector. This may be reached, for example, by combining the electrode strips in groups of two, in which the primary winding of a small transformer is connected between the two electrode strips of each group as a result of which only the differential voltage of the two electrode strips in question appears on the secondary side of said transformer. Usually the polarization voltage per group is applied to the center tapping of the transformer.

The crosstalk in detectors having a thin semiconductor slice can indeed be reduced in the above-described manner to a level which is also observed in detectors having a semiconductor slice which has a thickness such that the above-mentioned capacitive coupling cannot play any significant part.

In practice it is found, however, that the electric crosstalk, both in the case of a thin semiconductor slice in which the contribution caused by the above-mentioned capacitive coupling is eliminated, and in the case of a thick semiconductor slice, is still undesirably large for many measurements and the object of the invention therefore is to further reduce the electric crosstalk in such devices.

It has surprisingly been found that such a reduction of the crosstalk level can be reached by using ancillary voltages between adjacent electrode strips of the same electrode and the semiconductor device of the type mentioned in the preamble according to the invention therefore is characterized in that an ancillary voltage which is small with respect to the polarization voltage is applied at least between two adjacent electrode strips of the same electrode to suppress electric crosstalk.

The invention is of particular importance in semiconductor devices which comprise a detector two electrodes of which are subdivided into a number of parallel electrode strips separated from each other, the electrode strips on one side of the slice intersecting those on the other side of the slice. The polarization voltage in these semiconductor devices often has a value at which the depletion layer formed at the rectifying junction polarized in the reverse direction fills the space between the two electrodes entirely or substantially entirely.

Such detectors are very suitable for applications in which location of the radiation to be detected in two coordinates is of importance and it will be obvious that in such a location the suppression of the crosstalk is highly desirable. In addition, due to the fact that substantially the whole space between the electrodes can be used as a sensitive space, said detectors are suitable for being used as (dE/dx)-detectors. In that case said detectors comprise preferably a thin semiconductor slice, as a result of which the signals to be observed are small so that the suppression of the crosstalk is additionally important.

It has been found that the use of the invention is very effective in those cases in which the rectifying junction is of the Schottky type.

At least the electrode constituting the rectifying junction is usually subdivided into strips and, independently of the fact whether the other electrode is divided into strips or is not divided into strips, the crosstalk is already suppressed for the greater part if the ancillary voltages are applied between the electrode strips of the electrode constituting the rectifying junction.

When applying the ancillary voltage it is recommended to ensure that the voltage difference between any two selected electrode strips of the same electrode remains restricted. Said voltage difference preferably does not exceed the ancillary voltage.

A particularly important embodiment of a semiconductor device according to the invention is characterized in that the electrode strips associated with the same electrode are connected, at least partly, in groups of two to means for deriving the difference of the electric signals of the two strips of a group, the ancillary voltage being applied between different groups. Since the electric signals are derived between the two strips of a group, the stray signals as a result of the above-mentioned capacitive coupling are eliminated while the remaining crosstalk is suppressed by the applied ancillary voltage.

An ancillary voltage which has an alternating character is advantageously used as a result of which influences of the applied ancillary voltage on the properties of the electrode strips are evenly distributed in time over all the electrode strips.

Figure 2:
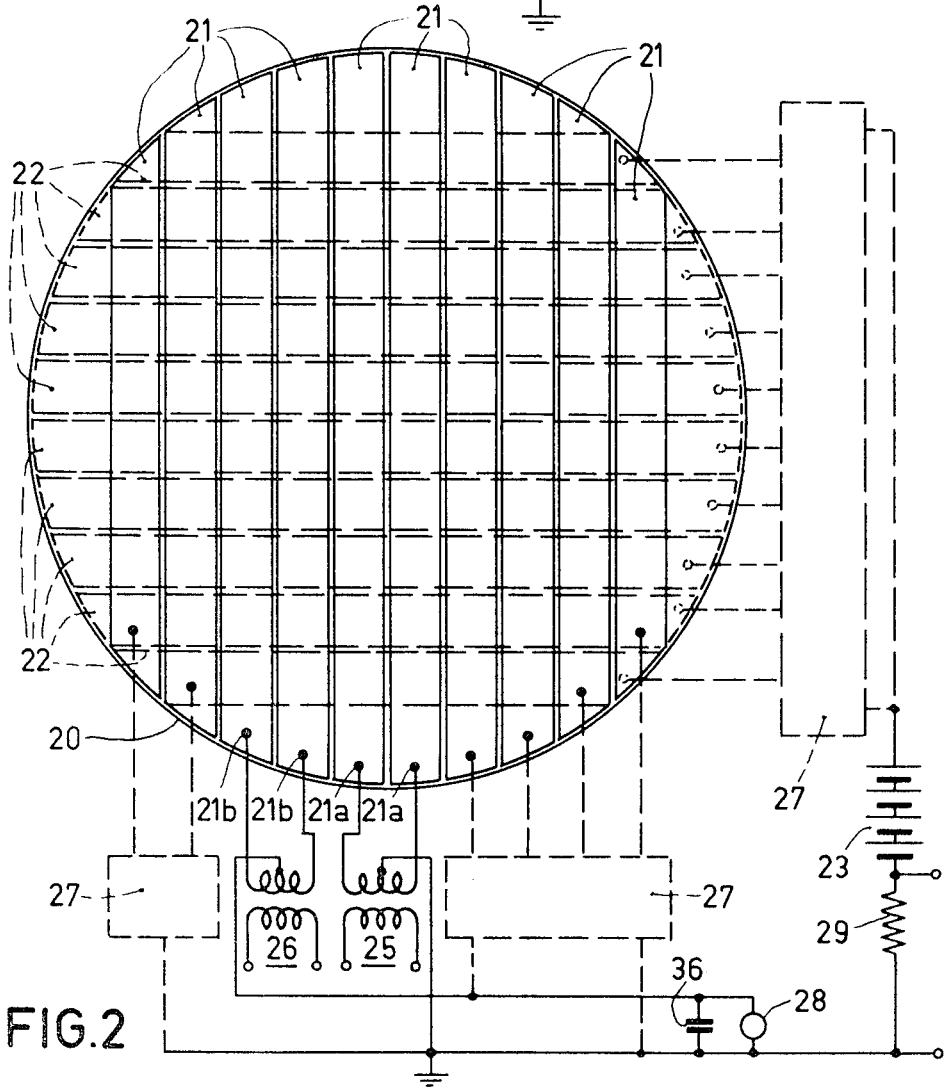

In order that the invention may be readily carried into effect, a few embodiments thereof will now be described in greater detail, by way of example, with reference to the accompanying drawing, in which FIG. 1 diagrammatically shows an embodiment of a semiconductor device according to the invention, FIG. 2 diagrammatically shows another embodiment of a semiconductor device according to the invention.

FIG. 1 shows an example of a semiconductor device according to the invention comprising a monocrystalline slice 1 of semiconductor material the two large oppositely located surfaces of which are provided with electrodes 2 and 16 in which at least the electrode 16 constitutes a rectifying junction with the slice 1 and a polarization voltage is applied between the electrodes 2 and 16 by means of a voltage source 7, the rectifying junction being polarized in the reverse direction and the other electrode 2 constituting a conductive junction or ohmic connection with the slice, the electrode 16 being subdivided into a number of parallel electrode strips 3, 4, 5 and 6 separated from one another.

According to the invention, in order to suppress the electric crosstalk between the electrode strips, an ancillary voltage is applied between at least two adjacent electrode strips, in the present example between the electrode strips 3 and 4, 4 and 5, and 5 and 6, which voltage is small with respect to the polarization voltage. This ancillary voltage is supplied by the voltage source 8 which can be decoupled in the conventional manner by means of a capacitor 17. The ancillary voltage is applied so that the potential difference between two of the electrode strips 3, 4, 5 and 6 is at most equal to the ancillary voltage. As a result of this it is reached that the potential differences between the electrode 2 on the one hand and each of the electrode strips 3, 4, 5 and 6 on the other hand, are substantially equal.

It has been found that the value of the ancillary voltage which is necessary for a satisfactory suppression of the crosstalk is dependent upon the detector used. For example, the semiconductor material and the distance between the electrode strips play a part. It is suspected that the crosstalk takes place via surface channels which are cut off by applying the ancillary voltage. For the rest, the desired ancillary voltage can simply be determined empirically for each individual case by those skilled in the art. In conventional detectors the distance between the electrode strips usually is smaller than 1 mm., and said distance preferably is in the order of 100 $\mu$m. The required ancillary voltage usually is amply below the level at which breakdown occurs between adjacent electrode strips. In practice good results are usually obtained with an ancillary voltage of the order of 1 v. The polarization voltage in practice usually lies between approximately 10 v. and approximately 1 Kv. The ancillary voltage is small with respect to the polarization voltage and at any rate is chosen to be so that the electric field which is caused in the semiconductor body by the polarization voltage is substantially not adversely influenced by it.

The slice 1 may consist of N-type silicon having a resistivity of 10,000 ohm-cm. and a thickness of 1,000 $\mu$m. The surface of the slice 1 is, for example, rectangular and has dimensions of 3 cm. ×1 cm. The electrodes 2 and 16 may consist of gold and may be provided in any conventional manner on the semiconductor slice 1. The strips 3, 4, 5 and 6 have width of, for example, 425 $\mu$m. while their mutual distance is approximately 75 $\mu$m. The electrode 16 is subdivided, for example, in approximately 50 electrode strips. In the FIG. four of them are shown diagrammatically.

The junction polarized in the reverse direction between the semiconductor slice 1 and the electrode 16 is of the Schottky type. In the present example, the polarization voltage is approximately 200 v. and the ancillary voltage is approximately 1 v.

The electric signals for the location can be derived in any conventional manner through suitably chosen impedances 9, 10, 11 and 12. If, for example, the energy absorbed in the detector is to be measured in addition, a signal may for that purpose be derived at the terminals 14 and 15 through the impedance 13 which may be applied, for example, to a charge amplifier and further to conventional measuring and/or recording apparatus.

The second example to be described with reference to FIG. 2 is that of a (dE/dx)-detector. Such counters are frequently used, for example, in so-called E. (dE/dx)-telescopes for observations of radiation of electrically charged particles, for example, $\alpha$-particles, deuterons and protons.

The (dE/dx)-detector shown in FIG. 2 comprises a silicon slice 20 which may have a diameter of approximately 25 mm. The thickness of the slice is, for example, 300 $\mu$m. An electrode of approximately $2.10^{-4}$ g./sq.cm. consisting of pure gold is vapor deposited on the upper side of the slice which is of the N-type and has a resistivity of approximately 5,000 ohm-cm., which electrode is subdivided into a number of parallel mutually separated strips 21. An electrode subdivided into strips 22 consisting of aluminum is vapor deposited on the lower side of the slice, the strips 22 intersecting the strips 21. The strips 22 of, for example, $5.10^{-5}$ g./sq.cm. are shown in the drawing by broken lines.

The gold electrode forms a junction of the Schottky type on the high-ohmic silicon. This junction is polarized in the reverse direction by means of a voltage source 23, which is included in the circuit which is connected to the strips 21 and the strips 22. The strips 22 constitute a conductive junction with the slice. At the polarization voltage of 150 v. chosen, the depletion layer formed at the strips 21 substantially fills the whole space between the electrodes.

The electrode strips 21 and 22 have a width, for example, of 1.3 mm. and the distance between two adjacent strips is approximately 100 $\mu$m.

It is shown in the FIGS. for the electrode strips 21a and 21b how the strips are connected in groups of two to small transformers 25, 26. The remaining electrode strips 21 are connected in a quite corresponding manner. In order to avoid complexity of the drawing, said connections are diagrammatically shown as blocks 27. The primary winding of the transformer 25 is connected to two strips 21a, that of the transformer 26 to two strips 21b. The center tappings of the primary windings of the transformers 25, 26 are connected to the voltage source 23. With the transformer 26, a voltage source 28 is included in series in said connection with the voltage source 23. If required, a capacitance 36 may be connected parallel to the voltage source 28. An ancillary voltage of approximately 1 v. is set up by means of the voltage source 28. The applied potential for the two strips of a group 21a and for the two strips of the group 21b is the same, while the ancillary voltage is applied between the groups 21a and 21b. The electric signals which occur between the strips of the groups 21a and between the strips of the group 21b, respectively, can be derived on the secondary side of the transformers 25 and 26, and be applied to further apparatus, for example, to a pulse amplifier. This part of the device is not essential for the description of the invention and is not shown in the drawing.

The electric signals derived from the transformers 25 and 26 contain the information regarding the location on which the particles of the incident radiation impinge upon the detector.

Usually the (dE/dx)-signal is derived through a resistor 29 which is included in series with the voltage source 23 in the circuit which connects the strips 21 and the strips 22. This (dE/dx)-signal contains the information regarding the energy which the particle in question has given off to the detector on its way through the detector.

If in the (dE/dx)-detector described no steps are taken to restrict the crosstalk, stray signals may occur to a value of 30 percent of the desired signal. After the crosstalk through the capacitive coupling has been eliminated in the conventional manner, this percentage is reduced to approximately 10 percent. If, for example, when using the invention, an ancillary voltage is applied between the gold strips a further improvement up to approximately 4 percent is the result.

It is to be noted that an effective suppression of the crosstalk can be obtained by means of a direct voltage. Often, however, for reasons of symmetry an ancillary voltage having an alternating character will be preferred, the ancillary voltage changing sign many times during the same experiment. In this manner, influences, if any, of the ancillary voltage on the properties of the electrode strips are distributed between the electrode strips evenly with time. For that purpose, the voltage source 28 may be a source which supplies an alternating voltage with an amplitude of approximately 1 v. Preferably a square wave voltage will be used, because the change of sign takes place then during a short part of the cycle.

However, the use of an alternating ancillary voltage means that a small charge transport will occur in the electrode system which is not caused by detected radiation.

The electrode strips of a group in the present example, for example, the strips 21a, are adjacent strips. The arrangement in groups of two, however, may also be effected differently. For example, two adjacent electrode strips may always be associated with different groups, or the electrode in question may be divided into two halves, in which always one electrode strip of one-half and one strip of the other half are combined to a group.

It will be obvious that the invention is not restricted to the examples described and that many variations are possible to those skilled in the art without departing from the scope of this invention. For example, other semiconductor materials, for example, Ge, and other electrode materials, for example, magnesium and platinum, may be used. Alternatively, the electric signals between two electrode strips may be derived in a different manner than through a transformer, for example, through a difference amplifier. The proportions of the detector, the number of strips and, for example, also the resistivity of the semiconductor material may be varied.

What we claim is:

1. Radiation detection apparatus comprising a semiconductor device; said device comprising a single crystal disc of semiconductor material having opposed major surfaces, means forming a rectifying electrode on one major surface, and means forming an electrode on the opposite major surface, at least one of said electrodes comprising a plurality of mutually insulated, strip-shaped electrode portions; means for applying across the electrodes a voltage biasing the rectifying electrode in the reverse direction, output means coupled to the strip-shaped electrode portions, and means for applying at least between two adjacent strip-shaped electrode portions of said one electrode an ancillary voltage which is small relative to the reverse biasing voltage to suppress crosstalk in the output.

2. Radiation detection apparatus as set forth in claim 1 wherein the disc is of silicon of N-type conductivity and said one electrode is the rectifying electrode and is of the Schottky type and the other electrode is an ohmic electrode.

3. Radiation detection apparatus as set forth in claim 1 wherein the other electrode forms an ohmic electrode, each of said electrodes comprise a plurality of mutually insulated, parallel, strip-shaped electrode portions, the strip-shaped electrode portions of one electrode crossing over the strip-shaped electrode portions of the other electrode, and means are provided for applying across the ohmic and rectifying electrode portions a voltage at which the resultant depletion layer within the disc occupies approximately the whole space between the electrodes.

4. Radiation detection apparatus as set forth in claim 1 wherein the rectifying electrode is strip shaped, and the output means is connected to each of substantially all of the strip-shaped electrode portions.

5. Radiation detection apparatus as set forth in claim 4 wherein the maximum potential difference between two strips of the strip-shaped electrode portions is the ancillary voltage.

6. Radiation detection apparatus as set forth in claim 4 and including means connecting the electrode strips on one side of the disc in groups of two to produce an output signal corresponding only to the voltage difference occurring between the strip pair of a group upon the incidence of radiation, the ancillary voltage being applied between different groups.

7. Radiation detection apparatus as set forth in claim 1 wherein the biasing voltage is a DC voltage and the ancillary voltage is an AC voltage of constant frequency and amplitude.

8. Radiation detection apparatus as set forth in claim 1 wherein the biasing voltage is a high DC voltage, and the ancillary voltage is a low DC voltage.

* * * * *